US011092613B2

(12) United States Patent
Mahmudimanesh et al.

(10) Patent No.: US 11,092,613 B2
(45) Date of Patent: Aug. 17, 2021

(54) METHOD OF OPERATING A LABORATORY SAMPLE DISTRIBUTION SYSTEM, LABORATORY SAMPLE DISTRIBUTION SYSTEM AND LABORATORY AUTOMATION SYSTEM

(71) Applicant: Roche Diagnostics Operations, Inc., Indianapolis, IN (US)

(72) Inventors: Mohammadreza Mahmudimanesh, Darmstadt (DE); Sophia Bruntsch, Stuttgart (DE); Soraya Garcia Bustos, Stuttgart (DE); Walter Ebner, Kernen (DE); Shubin Ren, Remseck (DE); Mohsin Reza, Stuttgart (DE); Daniel Diez Diaz-Calonge, Stuttgart (DE)

(73) Assignee: Roche Diagnostics Operations, Inc., Indianapolis, IN (US)

( * ) Notice: Subject to any disclaimer, the term of this patent is extended or adjusted under 35 U.S.C. 154(b) by 333 days.

(21) Appl. No.: 15/809,032

(22) Filed: Nov. 10, 2017

(65) Prior Publication Data
US 2018/0067141 A1    Mar. 8, 2018

Related U.S. Application Data (63) Continuation of application No. PCT/EP2016/061310, filed on May 19, 2016.

(30) Foreign Application Priority Data

May 22, 2015   (EP) ..................................... 15168783

(51) Int. Cl.
*G01N 35/04*    (2006.01)
*G01N 35/00*    (2006.01)

(52) U.S. Cl.
CPC ...... *G01N 35/04* (2013.01); *G01N 2035/0093* (2013.01); *G01N 2035/0406* (2013.01); *G01N 2035/0462* (2013.01)

(58) Field of Classification Search
CPC ........................ G01N 2035/0093–0096; G01N 35/0092–0095
(Continued)

(56) References Cited

U.S. PATENT DOCUMENTS 3,273,727 A   9/1966   Rogers et al.
3,653,485 A   4/1972   Donlon
(Continued)

FOREIGN PATENT DOCUMENTS

CN   201045617 Y   4/2008
CN   102109530 A   6/2011
(Continued)

OTHER PUBLICATIONS

Gue, Kevin R. and Kim, Byung Soo, Puzzle-Based Storage Systems, Naval Research Logistics, 2007, pp. 556-567, vol. 54.
(Continued)

*Primary Examiner* — Alexander A Mercado
(74) *Attorney, Agent, or Firm* — Roche Diagnostics Operations, Inc.

(57) ABSTRACT

A method of operating a laboratory sample distribution system is presented. The laboratory sample distribution system comprises a number of sample container carriers. The sample container carriers are adapted to carry one or more sample containers. The sample containers comprise samples to be analyzed by a number of laboratory stations. The laboratory sample distribution system also comprises a transport plane. The transport plane is adapted to support the sample container carriers. The method comprises allocating an area of the transport plane as a buffer area. The buffer area (Continued)

is adapted to store a variable number of sample container carriers. The method also comprises controlling the buffer area using a puzzle-based control scheme or using an aisle-based control scheme as a function of a storage density of the buffer area.

15 Claims, 5 Drawing Sheets

(58) Field of Classification Search
USPC .................................................. 73/863.01
See application file for complete search history.

(56) References Cited

U.S. PATENT DOCUMENTS

| | | |
|---|---|---|
| 3,901,656 A | 8/1975 | Durkos et al. |
| 4,150,666 A | 4/1979 | Brush |
| 4,395,164 A | 7/1983 | Beltrop et al. |
| 4,544,068 A | 10/1985 | Cohen |
| 4,771,237 A | 9/1988 | Daley |
| 5,120,506 A | 6/1992 | Saito et al. |
| 5,295,570 A | 3/1994 | Grecksch et al. |
| 5,309,049 A | 5/1994 | Kawada et al. |
| 5,457,368 A | 10/1995 | Jacobsen et al. |
| 5,523,131 A | 6/1996 | Isaacs et al. |
| 5,530,345 A | 6/1996 | Murari et al. |
| 5,636,548 A | 6/1997 | Dunn et al. |
| 5,641,054 A | 6/1997 | Mori et al. |
| 5,651,941 A | 7/1997 | Stark et al. |
| 5,720,377 A | 2/1998 | Lapeus et al. |
| 5,735,387 A | 4/1998 | Polaniec et al. |
| 5,788,929 A | 8/1998 | Nesti |
| 6,045,319 A | 4/2000 | Uchida et al. |
| 6,062,398 A | 5/2000 | Thalmayr |
| 6,141,602 A | 10/2000 | Igarashi et al. |
| 6,151,535 A | 11/2000 | Ehlers |
| 6,184,596 B1 | 2/2001 | Ohzeki |
| 6,191,507 B1 | 2/2001 | Peltier et al. |
| 6,206,176 B1 | 3/2001 | Blonigan et al. |
| 6,255,614 B1 | 7/2001 | Yamakawa et al. |
| 6,260,360 B1 | 7/2001 | Wheeler |
| 6,279,728 B1 | 8/2001 | Jung et al. |
| 6,293,750 B1 | 9/2001 | Cohen et al. |
| 6,429,016 B1 | 8/2002 | McNeil |
| 6,444,171 B1 | 9/2002 | Sakazume et al. |
| 6,571,934 B1 | 6/2003 | Thompson et al. |
| 7,028,831 B2 | 4/2006 | Veiner |
| 7,078,082 B2 | 7/2006 | Adams |
| 7,122,158 B2 | 10/2006 | Itoh |
| 7,278,532 B2 | 10/2007 | Martin |
| 7,326,565 B2 | 2/2008 | Yokoi et al. |
| 7,425,305 B2 | 9/2008 | Itoh |
| 7,428,957 B2 | 9/2008 | Schaefer |
| 7,578,383 B2 | 8/2009 | Itoh |
| 7,597,187 B2 | 10/2009 | Bausenwein et al. |
| 7,850,914 B2 | 12/2010 | Veiner et al. |
| 7,858,033 B2 | 12/2010 | Itoh |
| 7,875,254 B2 | 1/2011 | Garton et al. |
| 7,939,484 B1 | 5/2011 | Loeffler et al. |
| 8,240,460 B1 | 8/2012 | Bleau et al. |
| 8,281,888 B2 | 10/2012 | Bergmann |
| 8,502,422 B2 | 8/2013 | Lykkegaard |
| 8,796,186 B2 | 8/2014 | Shirazi |
| 8,833,544 B2 | 9/2014 | Stoeckle et al. |
| 8,973,736 B2 | 3/2015 | Johns et al. |
| 9,056,720 B2 | 6/2015 | Van De Loecht et al. |
| 9,097,691 B2 | 8/2015 | Onizawa et al. |
| 9,187,268 B2 | 11/2015 | Denninger et al. |
| 9,211,543 B2 | 12/2015 | Ohga et al. |
| 9,239,335 B2 | 1/2016 | Heise et al. |
| 9,423,410 B2 | 8/2016 | Buehr |
| 9,423,411 B2 | 8/2016 | Riether |
| 9,567,167 B2 | 2/2017 | Sinz |
| 9,575,086 B2 | 2/2017 | Heise et al. |
| 9,593,970 B2 | 3/2017 | Sinz |
| 9,598,243 B2 | 3/2017 | Denninger et al. |
| 9,618,525 B2 | 4/2017 | Malinowski et al. |
| 9,658,241 B2 | 5/2017 | Riether et al. |
| 9,664,703 B2 | 5/2017 | Heise et al. |
| 9,772,342 B2 | 9/2017 | Riether |
| 9,791,468 B2 | 10/2017 | Riether et al. |
| 9,810,706 B2 | 11/2017 | Riether et al. |
| 10,126,317 B2 | 11/2018 | Heise et al. |
| 10,197,586 B2 | 2/2019 | Sinz et al. |
| 10,288,634 B2 | 5/2019 | Kaeppeli |
| 10,352,953 B2 | 7/2019 | Huber et al. |
| 10,416,183 B2 | 9/2019 | Hassan |
| 10,495,657 B2 | 12/2019 | Malinowski |
| 2002/0009391 A1 | 1/2002 | Marquiss et al. |
| 2002/0028158 A1 | 3/2002 | Wardlaw |
| 2004/0050836 A1 | 3/2004 | Nesbitt et al. |
| 2004/0084531 A1 | 5/2004 | Itoh |
| 2005/0061622 A1 | 3/2005 | Martin |
| 2005/0109580 A1 | 5/2005 | Thompson |
| 2005/0194333 A1 | 9/2005 | Veiner et al. |
| 2005/0196320 A1 | 9/2005 | Veiner et al. |
| 2005/0226770 A1 | 10/2005 | Allen et al. |
| 2005/0242963 A1 | 11/2005 | Oldham et al. |
| 2005/0247790 A1 | 11/2005 | Itoh |
| 2005/0260101 A1 | 11/2005 | Nauck et al. |
| 2005/0271555 A1 | 12/2005 | Itoh |
| 2006/0000296 A1 | 1/2006 | Salter |
| 2006/0047303 A1 | 3/2006 | Ortiz et al. |
| 2006/0219524 A1 | 10/2006 | Kelly et al. |
| 2007/0116611 A1 | 5/2007 | DeMarco |
| 2007/0210090 A1 | 9/2007 | Sixt et al. |
| 2007/0248496 A1 | 10/2007 | Bondioli et al. |
| 2007/0276558 A1 | 11/2007 | Kim |
| 2008/0012511 A1 | 1/2008 | Ono |
| 2008/0029368 A1 | 2/2008 | Komori |
| 2008/0056328 A1 | 3/2008 | Rund et al. |
| 2008/0131961 A1 | 6/2008 | Crees et al. |
| 2009/0004732 A1 | 1/2009 | LaBarre et al. |
| 2009/0022625 A1 | 1/2009 | Lee et al. |
| 2009/0081771 A1 | 3/2009 | Breidford et al. |
| 2009/0128139 A1 | 5/2009 | Drenth et al. |
| 2009/0142844 A1 | 6/2009 | Le Comte |
| 2009/0180931 A1 | 7/2009 | Silbert et al. |
| 2009/0322486 A1 | 12/2009 | Gerstel |
| 2010/0000250 A1 | 1/2010 | Sixt |
| 2010/0152895 A1 | 6/2010 | Dai |
| 2010/0175943 A1 | 7/2010 | Bergmann |
| 2010/0186618 A1 | 7/2010 | King et al. |
| 2010/0255529 A1 | 10/2010 | Cocola et al. |
| 2010/0300831 A1 | 12/2010 | Pedrazzini |
| 2010/0312379 A1 | 12/2010 | Pedrazzini |
| 2011/0050213 A1 | 3/2011 | Furukawa |
| 2011/0124038 A1 | 5/2011 | Bishop et al. |
| 2011/0172128 A1 | 7/2011 | Davies et al. |
| 2011/0186406 A1 | 8/2011 | Kraus et al. |
| 2011/0287447 A1 | 11/2011 | Norderhaug et al. |
| 2012/0037696 A1 | 2/2012 | Lavi |
| 2012/0129673 A1 | 5/2012 | Fukugaki et al. |
| 2012/0178170 A1 | 7/2012 | Van Praet |
| 2012/0211645 A1 | 8/2012 | Tullo et al. |
| 2012/0275885 A1 | 11/2012 | Furrer et al. |
| 2012/0282683 A1 | 11/2012 | Mototsu |
| 2012/0295358 A1 | 11/2012 | Ariff et al. |
| 2012/0310401 A1 | 12/2012 | Shah |
| 2013/0034410 A1 | 2/2013 | Heise et al. |
| 2013/0153677 A1 | 6/2013 | Leen et al. |
| 2013/0180824 A1 | 7/2013 | Kleinikkink et al. |
| 2013/0263622 A1 | 10/2013 | Mullen et al. |
| 2013/0322992 A1 | 12/2013 | Pedrazzini |
| 2014/0170023 A1 | 6/2014 | Saito et al. |
| 2014/0231217 A1* | 8/2014 | Denninger ............ B65G 54/02 198/358 |
| 2014/0234949 A1 | 8/2014 | Wasson et al. |
| 2015/0014125 A1 | 1/2015 | Hecht |
| 2015/0140668 A1 | 5/2015 | Mellars et al. |
| 2015/0166265 A1 | 6/2015 | Pollack et al. |
| 2015/0241457 A1 | 8/2015 | Miller |
| 2015/0273468 A1 | 10/2015 | Croquette et al. |

(56) References Cited

U.S. PATENT DOCUMENTS

| | | |
|---|---|---|
| 2015/0273691 A1 | 10/2015 | Pollack |
| 2015/0276775 A1 | 10/2015 | Mellars et al. |
| 2015/0276782 A1 | 10/2015 | Riether |
| 2016/0003859 A1 | 1/2016 | Wenczel et al. |
| 2016/0025756 A1 | 1/2016 | Pollack et al. |
| 2016/0054341 A1 | 2/2016 | Edelmann |
| 2016/0077120 A1 | 3/2016 | Riether |
| 2016/0229565 A1 | 8/2016 | Margner |
| 2016/0274137 A1 | 9/2016 | Baer |
| 2016/0282378 A1 | 9/2016 | Malinowski et al. |
| 2016/0341750 A1 | 11/2016 | Sinz et al. |
| 2016/0341751 A1 | 11/2016 | Huber et al. |
| 2017/0059599 A1 | 3/2017 | Riether |
| 2017/0096307 A1 | 4/2017 | Mahmudimanesh et al. |
| 2017/0097372 A1 | 4/2017 | Heise et al. |
| 2017/0101277 A1 | 4/2017 | Malinowski |
| 2017/0108522 A1 | 4/2017 | Baer |
| 2017/0131307 A1 | 5/2017 | Pedain |
| 2017/0131309 A1 | 5/2017 | Pedain |
| 2017/0131310 A1 | 5/2017 | Volz et al. |
| 2017/0138971 A1 | 5/2017 | Heise et al. |
| 2017/0160299 A1 | 6/2017 | Schneider et al. |
| 2017/0168079 A1 | 6/2017 | Sinz |
| 2017/0174448 A1 | 6/2017 | Sinz |
| 2017/0184622 A1 | 6/2017 | Sinz et al. |
| 2017/0248623 A1 | 8/2017 | Kaeppeli et al. |
| 2017/0248624 A1 | 8/2017 | Kaeppeli et al. |
| 2017/0363608 A1 | 12/2017 | Sinz |
| 2018/0106821 A1 | 4/2018 | Vollenweider et al. |
| 2018/0128848 A1 | 5/2018 | Schneider et al. |
| 2018/0188280 A1 | 7/2018 | Malinowski |
| 2018/0210000 A1 | 7/2018 | van Mierlo |
| 2018/0210001 A1 | 7/2018 | Reza |
| 2018/0224476 A1 | 8/2018 | Birrer et al. |
| 2018/0340951 A1 | 11/2018 | Kaeppell |
| 2018/0340952 A1 | 11/2018 | Kaeppeli et al. |
| 2018/0348244 A1 | 12/2018 | Ren |
| 2018/0348245 A1 | 12/2018 | Schneider et al. |
| 2019/0018027 A1 | 1/2019 | Hoehnel |
| 2019/0076845 A1 | 3/2019 | Huber et al. |
| 2019/0076846 A1 | 3/2019 | Durco et al. |
| 2019/0086433 A1 | 3/2019 | Hermann et al. |
| 2019/0094251 A1 | 3/2019 | Malinowski |
| 2019/0094252 A1 | 3/2019 | Waser et al. |
| 2019/0101468 A1 | 4/2019 | Haldar |
| 2019/0285660 A1 | 9/2019 | Kopp et al. |

FOREIGN PATENT DOCUMENTS

| | | | |
|---|---|---|---|
| DE | 3909786 A1 | 9/1990 | |
| DE | 102012000665 A1 | 8/2012 | |
| DE | 102011090044 A1 | 7/2013 | |
| EP | 0601213 A1 | 10/1992 | |
| EP | 0775650 A1 | 5/1997 | |
| EP | 0916406 A2 | 5/1999 | |
| EP | 1122194 A1 | 8/2001 | |
| EP | 1524525 A1 | 4/2005 | |
| EP | 2119643 A1 | 11/2009 | |
| EP | 2148117 A1 | 1/2010 | |
| EP | 2327646 A1 | 6/2011 | |
| EP | 2447701 A2 | 5/2012 | |
| EP | 2500871 A1 | 9/2012 | |
| EP | 2589966 A1 * | 5/2013 | ............ G01N 35/04 |
| EP | 2502675 B1 | 2/2014 | |
| EP | 2887071 A1 | 6/2015 | |
| GB | 2165515 A | 4/1986 | |
| JP | S56-147209 A | 11/1981 | |
| JP | 60-223481 A | 11/1985 | |
| JP | 61-081323 A | 4/1986 | |
| JP | S61-069604 A | 4/1986 | |
| JP | S61-094925 A | 5/1986 | |
| JP | S61-174031 A | 8/1986 |
| JP | S61-217434 A | 9/1986 |
| JP | S62-100161 A | 5/1987 |
| JP | S63-31918 A | 2/1988 |
| JP | S63-48169 A | 2/1988 |
| JP | S63-82433 U | 5/1988 |
| JP | S63-290101 A | 11/1988 |
| JP | 1148966 A | 6/1989 |
| JP | H01-266860 A | 10/1989 |
| JP | H02-87903 A | 3/1990 |
| JP | 03-112393 A | 5/1991 |
| JP | 03-192013 A | 8/1991 |
| JP | H03-38704 Y2 | 8/1991 |
| JP | H04-127063 A | 4/1992 |
| JP | H05-69350 A | 3/1993 |
| JP | H05-142232 A | 6/1993 |
| JP | H05-180847 A | 7/1993 |
| JP | 06-26808 A | 2/1994 |
| JP | H06-148198 A | 5/1994 |
| JP | 06-156730 A | 6/1994 |
| JP | 06-211306 A | 8/1994 |
| JP | 07-228345 A | 8/1995 |
| JP | 07-236838 A | 9/1995 |
| JP | H07-301637 A | 11/1995 |
| JP | H09-17848 A | 1/1997 |
| JP | H11-083865 A | 3/1999 |
| JP | H11-264828 A | 9/1999 |
| JP | H11-304812 A | 11/1999 |
| JP | H11-326336 A | 11/1999 |
| JP | 2000-105243 A | 4/2000 |
| JP | 2000-105246 A | 4/2000 |
| JP | 2001-124786 A | 5/2001 |
| JP | 2001-240245 A | 9/2001 |
| JP | 2002-250147 A | 9/2002 |
| JP | 2005-001055 A | 1/2005 |
| JP | 2005-249740 A | 9/2005 |
| JP | 2006-106008 A | 4/2006 |
| JP | 2007-309675 A | 11/2007 |
| JP | 2007-314262 A | 12/2007 |
| JP | 2007-322289 A | 12/2007 |
| JP | 2009-036643 A | 2/2009 |
| JP | 2009-062188 A | 3/2009 |
| JP | 2009-145188 A | 7/2009 |
| JP | 2009-300402 A | 12/2009 |
| JP | 2010-243310 A | 10/2010 |
| JP | 2010-271204 A | 12/2010 |
| JP | 2013-172009 A | 2/2013 |
| JP | 2013-190400 A | 9/2013 |
| SU | 685591 A1 | 9/1979 |
| WO | 1996/036437 A1 | 11/1996 |
| WO | 2003/042048 A3 | 5/2003 |
| WO | 2007/024540 A1 | 3/2007 |
| WO | 2008/133708 A1 | 11/2008 |
| WO | 2009/002358 A1 | 12/2008 |
| WO | 2010/042722 A1 | 4/2010 |
| WO | 2012/170636 A1 | 7/2010 |
| WO | 2010/087303 A1 | 8/2010 |
| WO | 2010/129715 A1 | 11/2010 |
| WO | 2012/158520 A1 | 11/2012 |
| WO | 2012/158541 A1 | 11/2012 |
| WO | 2013/152089 A1 | 10/2013 |
| WO | 2013/169778 A1 | 11/2013 |
| WO | 2013/177087 A2 | 11/2013 |
| WO | 2013/177163 A1 | 11/2013 |
| WO | 2014/059134 A1 | 4/2014 |
| WO | 2014/071214 A1 | 5/2014 |
| WO | 2015/104263 A2 | 7/2015 |

OTHER PUBLICATIONS

International Search Report dated Nov. 7, 2016, in Application No. PCT/EP2016/061310, 3 pages.

* cited by examiner

METHOD OF OPERATING A LABORATORY SAMPLE DISTRIBUTION SYSTEM, LABORATORY SAMPLE DISTRIBUTION SYSTEM AND LABORATORY AUTOMATION SYSTEM

CROSS-REFERENCE TO RELATED APPLICATIONS

This application is a continuation of PCT/EP2016/061310, filed May 19, 2016, which is based on and claims priority to EP 15168783.7, filed May 22, 2015, which is hereby incorporated by reference.

BACKGROUND

The present disclosure relates to a method of operating a laboratory sample distribution system, a laboratory sample distribution system and a laboratory automation system.

Laboratory sample distribution systems are used in laboratory automation systems comprising a number of laboratory stations, for example pre-analytical, analytical and/or post-analytical stations. The laboratory sample distribution system can be used in order to distribute sample containers between the laboratory stations and other equipment. The sample containers are typically made of transparent plastic material or glass material and have an opening at an upper side. The sample containers can contain samples such as blood samples or other medical samples.

A typical laboratory sample distribution system can move sample container carriers on a transport plane. A number of electro-magnetic actuators are arranged below the transport plane in order to drive the sample container carriers.

However, there is a need for a method of operating a laboratory sample distribution system, a laboratory sample distribution system and a laboratory automation system having a high distribution performance at reduced transport space required.

SUMMARY

According to the present disclosure, a method of operating a laboratory sample distribution system is presented. The laboratory sample distribution system can comprise a number of sample container carriers. The sample container carriers can be adapted to carry one or more sample containers. The sample containers can comprise samples to be analyzed by a number of laboratory stations. The laboratory sample distribution system can also comprise a transport plane. The transport plane can be adapted to support the sample container carriers. The method can comprise allocating an area of the transport plane as a buffer area. The buffer area can be adapted to store a variable number of sample container carriers. The method can also comprise controlling the buffer area using a puzzle-based control scheme or using an aisle-based control scheme as a function of a storage density of the buffer area.

Accordingly, it is a feature of the embodiments of the present disclosure to provide a method of operating a laboratory sample distribution system, a laboratory sample distribution system and a laboratory automation system having a high distribution performance at reduced transport space required. Other features of the embodiments of the present disclosure will be apparent in light of the description of the disclosure embodied herein.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

DETAILED DESCRIPTION

In the following detailed description of the embodiments, reference is made to the accompanying drawings that form a part hereof, and in which are shown by way of illustration, and not by way of limitation, specific embodiments in which the disclosure may be practiced. It is to be understood that other embodiments may be utilized and that logical, mechanical and electrical changes may be made without departing from the spirit and scope of the present disclosure.

The presented method can be configured to operate a laboratory sample distribution system. The laboratory sample distribution system can comprise a number of sample container carriers. The sample container carriers can be adapted to carry one or more sample containers. The sample containers may comprise samples, e.g. to be analyzed by a number of laboratory stations.

The laboratory sample distribution system further comprises a transport plane, wherein the transport plane is adapted to support or carry the sample container carriers. In other words, the sample container carriers may simply be placed on the transport plane.

According to the operating method, a buffer area can be logically allocated on the transport plane. The allocating may comprise defining a size of the buffer area, and/or defining a location of the buffer area on the transport plane and/or defining a shape or outline of the buffer area. The buffer area can be adapted to store a variable number (e.g., 2 to 500) of sample container carriers. The buffer area can be adapted to buffer sample container carriers, e.g. if the sample container carriers are waiting for further movement over the transport plane and/or if a sample comprised in the sample container carrier can wait for further processing. Further, the buffer area may buffer empty sample container carriers.

According to the operating method, the buffer area can be controlled using a centralized control scheme which can be puzzle-based, or aisle-based, depending on a storage density of the buffer area.

The storage density may be defined as the number of sample container carriers being buffered inside the buffer area related to the maximum number of sample container carriers which can be buffered inside the buffer area. The storage density may be calculated as follows:

$$d = n/m,$$

wherein d denotes the storage density, n denotes the number of sample container carriers being buffered inside the buffer area, and m denotes the maximum number of sample container carriers which can be buffered inside the buffer area.

The function principles of puzzle-based control schemes and aisle-based control schemes are explained in detail in the publication: Gue K R, Kim B S (2007) Puzzle-based storage systems. Naval Res. Logist. 54(5):556-567, the disclosure of which is incorporated by reference regarding the function principles of puzzle-based control schemes and aisle-based control schemes.

The buffer area can be operated in a hybrid mode alternating between the puzzle-based control scheme and the aisle-based control scheme. If the storage density is low, the aisle-based control scheme may be used, thus optimizing a retrieval time of buffered sample container carriers. If the storage density is high, the puzzle-based control scheme may be used, thus optimizing the storage density of the buffered sample container carriers.

The selected control scheme can depend on the present storage density. Self-evidently, the control scheme may be selected as a function of further parameters, e.g., the total capacity of the buffer area, the shape of the buffer area, the time of day, and the like.

The puzzle-based control scheme can typically be used if the storage density is equal to or larger than an upper threshold. The aisle-based control scheme can typically be used if the storage density is equal to or smaller than a lower threshold. The upper threshold and the lower threshold may be different or may be identical. The upper threshold may denote a condition or storage density, when only a single field is free in the buffer area, i.e. the number of buffered sample container carriers is equal to the maximum number of sample container carriers which can be buffered in the buffer area minus 1. The lower threshold may denote a condition or storage density, when each sample container carrier being buffered can exit the buffer area by a corresponding aisle without the need to remove any furthers sample container carriers. For example, the upper threshold may have a value of about 0.9=90 percent (%), and in one embodiment about 0.99=99%. The lower threshold may have a value of about 0.67=67%, and in embodiment about 0.5=50%.

The buffer area may be controlled using a transition control scheme if the control scheme is switched from the aisle-based control scheme to the puzzle-based control scheme and/or switched from the puzzle-based control scheme to the aisle-based control scheme. During the transition control scheme functional principles between puzzle-based and aisle-based may be mixed. The transition control scheme may be used if the storage density lies between the lower threshold and the upper threshold.

If the storage density is equal to or smaller than the lower threshold, the aisle-based control scheme may be used, and in embodiment, operating with static or fixed aisles. If the storage density is above the lower threshold, the transition control scheme may be used, and in embodiment still being aisle-based but using block movement in order to form dynamic aisles on the buffer area. If there are many more sample container carriers to be buffered, exceeding the remaining space for aisles, the control may switch to a high density-algorithm that is puzzle-based. Thus, the density of sample container carriers on the buffer area may lead to three stages, each stage having its own control scheme or routing algorithm, respectively, and storage area design.

The sample container carriers may comprise at least one magnetically active device such as for example, at least one permanent magnet.

The laboratory sample distribution system may comprise a number of electro-magnetic actuators being stationary arranged in rows and columns (forming a grid having fields) below the transport plane. The electro-magnetic actuators may be adapted to apply a magnetic force to the container carriers such that the sample container carriers can move exclusively along the rows or along the columns. The electromagnetic actuators located inside the buffer area may be activated based on the puzzle-based control scheme or the aisle-based control scheme as a function of the storage density of the buffer area.

The buffer area may have a defined number, e.g. 1 to 100, of transfer locations. The sample container carriers can be transferred to/from the buffer area exclusively using/over the transfer locations. In one embodiment, the buffer area may have only one transfer location. The sample container carriers can be transferred to/from the buffer area exclusively using/over the only one transfer location. In one embodiment, the buffer area may have a defined number of transfer locations, which can serve only as an input into the buffer area, and the buffer area may have a defined number of transfer locations, which can serve only as an output out of the buffer area. The number of transfer locations and/or their location or position in the buffer area may be dynamically changed as a function of the number of sample container carriers to be buffered and/or as a function of the storage density.

Formulas for determining the transition point between the aisled-based control scheme and the transition control scheme or the lower threshold, respectively, are presented in the following. Thereby, it can be assumed that the buffer area is of size z times (*) z with z being a natural number equal to or larger than 3, e.g. 3, 4, 5, 6, 7 etc., and the buffer area having exactly one transfer location placed in a corner. If z is divisible by 3, then the point of transition is when the number of sample container carriers is more than $(2(z^2-z)/3)+1$. If the remainder of z mod 3 is 2 ("modulo operation"), then the point of transition is when the number of sample container carriers is over $((2z-1)*(z-1)/3)+1$. If the remainder of z mod 3 is 1, then the point of transition is when the number of sample container carriers is over $(2(z-1)2/3)+1$.

During the transition control scheme, the buffer area may be logically segmented into sub buffer areas. Each sub buffer area can have a respective sub transfer location. The sub buffer areas can be controlled individually and independent from one another using a puzzle-based control scheme. The respective sub transfer locations may each have a free connection or path to the transfer location.

During the aisle-based control scheme, the buffer area may have at least one one-way aisle. The sample container carriers can move or can be moved in a single direction or in only one direction in the one-way aisle. The one-way aisle may also be denoted as one-way passage way. In one embodiment, all aisles may be one-way aisles. Hence, when a first sample container carrier exits the buffer area and is retrieved from it and a second sample container carrier, which is different from the first sample container carrier, enters the buffer area and is stored within or inside it at the same time or simultaneously, the first and the second sample container carriers may not block each other. In other words, a deadlock in the buffer area, in particular at a transfer location if present, may be avoided.

The method comprising controlling the buffer area using the aisle-based control scheme may be independent of controlling the buffer area using the puzzle-based control scheme and/or the transition control scheme as a function of the storage density of the buffer area. The buffer area can have at least one one-way aisle. The sample container carriers can move in a single direction in the one-way aisle. In particular this may mean that the buffer area may be controlled using only the aisle-based control scheme and/or that the buffer area may not be operated in a hybrid mode.

The buffer area may have a rectangular shape. If the buffer has one or more transfer locations, the transfer location may be located, in particular statically, in a corner or in the middle of a long side of the rectangle.

A size of the buffer area, and/or a shape of the buffer area, and/or a structure of the buffer area may be dynamically changed as a function of the number of sample container carriers to be buffered and/or as a function of the storage density.

The laboratory sample distribution system can comprise a number (e.g. 2 to 2000) of sample container carriers. The sample container carriers can be adapted to carry one or more sample containers. The sample containers can comprise samples to be analyzed by a number of laboratory stations.

The laboratory sample distribution system can further comprise a transport plane. The transport plane can be adapted to support the sample container carriers such that the sample container carriers may propagate over the transport plane.

The laboratory sample distribution system can further comprise a control device, e.g. a Personal Computer (PC) controlling the remaining components, adapted to perform the above method.

The sample container carriers may respectively comprise at least one magnetically active device such as, for example at least one permanent magnet. The laboratory sample distribution system may comprise a number (e.g. 2 to 2000) of electro-magnetic actuators being stationary arranged in rows and columns below the transport plane. The electromagnetic actuators can be adapted to apply a magnetic force to the container carriers such that the sample container carriers can move exclusively along the rows or along the columns. The control device may be adapted to control the electromagnetic actuators located inside the buffer area based on the puzzle-based control scheme, or the aisle-based control scheme, as a function of the storage density of the buffer area.

The laboratory automation system can comprise a number of laboratory stations and a laboratory sample distribution system as described above. The laboratory sample distribution system can be adapted to distribute the sample container carriers between the laboratory stations. The stations may be pre-analytical and/or analytical and/or post-analytical stations of a laboratory automation system.

A pre-analytical station can usually serve for the pre-processing of samples or sample containers.

An analytical station may be designed for example for using a sample or part of the sample and a reagent to generate a measurable signal, on the basis of which it can be determined whether the analyte is present, and if so in what concentration.

A post-analytical station can usually serve for the post-processing of samples or sample containers.

The pre-analytical, analytical and post-analytical stations may, for example, have at least one station from the group of following stations: a cap-removing station for removing caps or closures on sample tubes, a cap-applying station for applying caps or closures to sample tubes, an aliquoting station for aliquoting samples, a centrifuging station for centrifuging samples, an archiving station for archiving samples, a pipetting station for pipetting, a sorting station for sorting samples or sample tubes, a sample-tube-type determining station for determining a type of sample tube and a sample-quality determining station for determining the quality of a sample.

Figure 1:
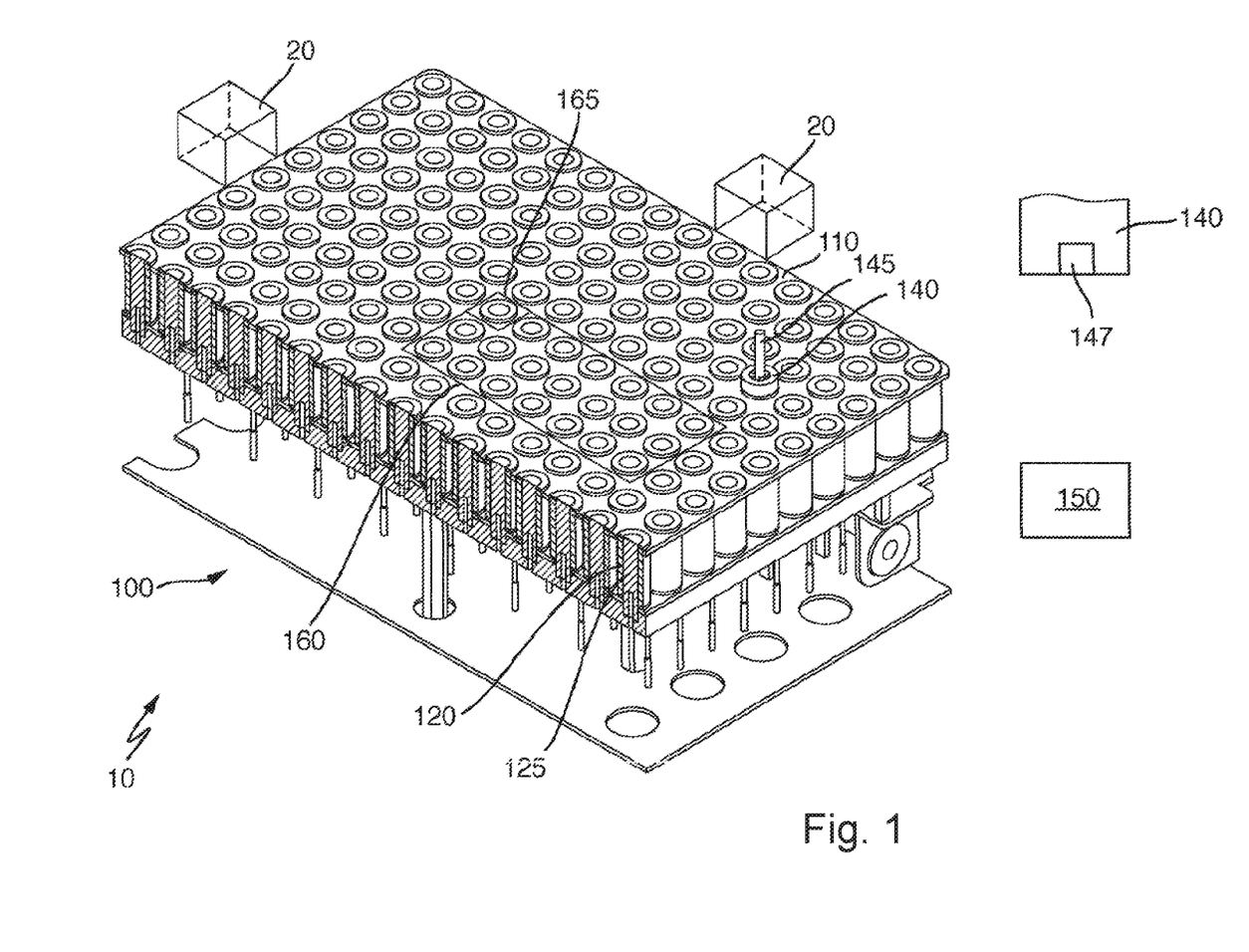
FIG. 1 illustrates schematically a laboratory automation system in a perspective view according to an embodiment of the present disclosure.

Referring initially to FIG. 1, FIG. 1 schematically illustrates a laboratory automation system 10. The laboratory automation system 10 can comprise a number of laboratory stations 20 such as, for example, pre-analytical, analytical and/or post-analytical stations. FIG. 1 depicts only two stations 20. Self-evidently, the laboratory automation system 10 may comprise more than two laboratory stations 20.

The laboratory automation system 10 can further comprise a laboratory sample distribution system 100 adapted to distribute sample container carriers 140 between the laboratory stations 20. As an example, only a single sample container carrier 140 is depicted. Self-evidently, the laboratory automation system 10 can typically comprise a large number of sample container carriers 140, e.g. 100 to several thousand of sample container carriers 140.

The sample container carriers 140 can be adapted to carry one or more sample containers 145. The sample containers 145 can comprise samples to be analyzed by the laboratory stations 20. The sample container carriers 140 can comprise a magnetically active device 147 in form of a single permanent magnet.

The laboratory sample distribution system 100 can comprise a transport plane 110. The transport plane 110 can be adapted to support the sample container carriers 140, such that the sample container carriers 140 can move over the transport plane 110.

The laboratory sample distribution system 100 can comprise a number of electro-magnetic actuators 120, each having a ferromagnetic core 125 being stationary arranged in rows and columns below the transport plane 110. The electro-magnetic actuators 120 can be adapted to apply a magnetic force to the sample container carriers 140, such that the sample container carriers can move along the rows or along the columns. The rows and columns can form logical fields, as depicted in FIGS. 2 to 5.

The laboratory sample distribution system 100 can further comprise a control device 150 adapted to centrally control the operation of the sample distribution system 100. For example, the control device 150 can control the complete set of electro-magnetic actuators 120, such that desired magnetic drive forces can be applied to the sample container carriers 140, such that the sample container carriers 140 can move simultaneously and independent from one another along desired transport paths.

The laboratory sample distribution system 100 can be operated by the control device 150 as follows.

An area of the transport plane 110 can be logically allocated as a buffer area 160. The buffer area 160 can be adapted to store a variable number of sample container carriers 140. The control device 150 can control the buffer area 160 using a puzzle-based control scheme or using an aisle-based control scheme as a function of a storage density of the buffer area 160.

The control device 150 can control sample container carriers 140 not being buffered in the buffer area 160 independent from the sample container carriers 140 being buffered in the buffer area 160. A control algorithm used for sample container carriers 140 not being buffered in the buffer area 160 can differ from a control algorithm used inside the buffer area 160. The controlling of/in the buffer area 160 can now be described in detail with reference to FIGS. 2 to 5.

Figure 2A:
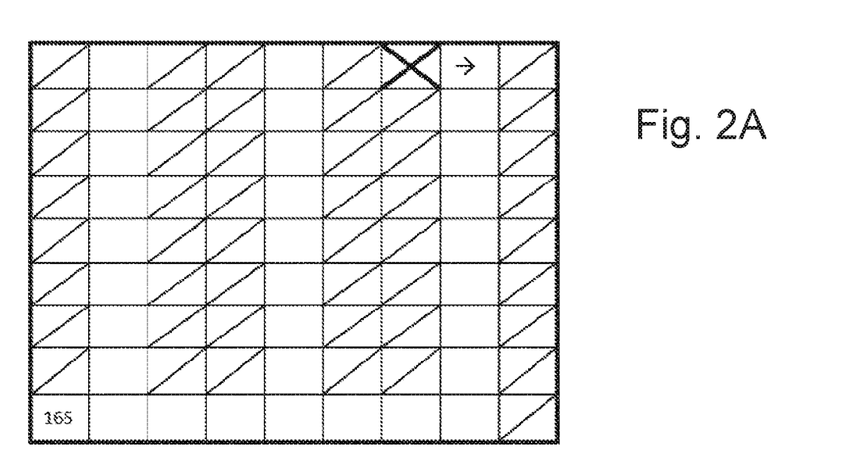
FIGS. 2A-B illustrate schematically a buffer area controlled using an aisle-based control scheme according to an embodiment of the present disclosure.
Figure 2B:
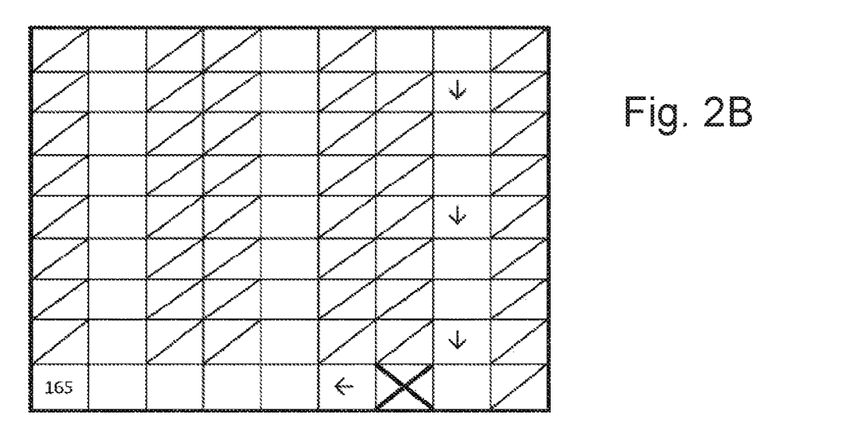

FIG. 2 schematically shows a buffer area controlled using an aisle-based control scheme. In FIGS. 2 to 5, a double-hatched field denotes a sample container carrier exiting or entering the buffer area 160, single-hatched fields denote sample container carriers being buffered in the buffer area 160, un-hatched fields denote free fields not being occupied by sample container carriers and 165 denotes a transfer location, i.e. an I/O port, of the buffer area 160. Sample container carriers can exclusively enter and leave the buffer area 160 by the transfer location 165, and in embodiment, the only one transfer location of the buffer area.

Now referring to FIG. 2A, a number of four aisles can be formed in the buffer area 160. Each sample container carrier being buffered can exit the buffer area 160 by a corresponding aisle, as depicted in FIG. 2B for an arbitrarily selected sample container carrier.

The storage density in FIG. 2, e.g. expressed as the number of occupied fields in the buffer area 160 dived through the total number of fields in the buffer area 160, can be exactly one value below a lower threshold. If more sample container carriers would have to be buffered in the buffer area 160, i.e. the storage density becomes larger than the lower threshold, the pure aisle-based control scheme can no longer be applicable. Self-evidently, if less sample container carriers than depicted in FIG. 2 are buffered, i.e. the storage density is lower than the lower threshold, the aisle-based control scheme can be applicable. Here, n is 49 and m is 81, making d=60%. If n were 50, d would be 62%. Hence, in this case, the lower threshold can be approximately 61%.

Figure 3A:
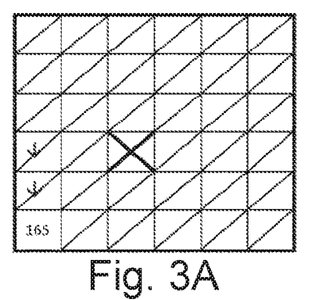
FIGS. 3A-F illustrate schematically a buffer area controlled using a puzzle-based control scheme according to an embodiment of the present disclosure.
Figure 3B:
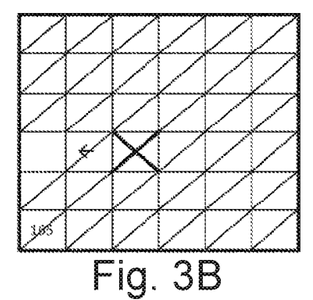
Figure 3C:
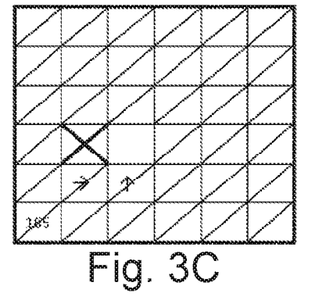
Figure 3D:
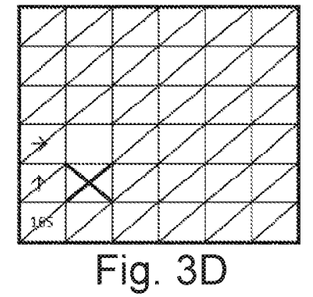
Figure 3E:
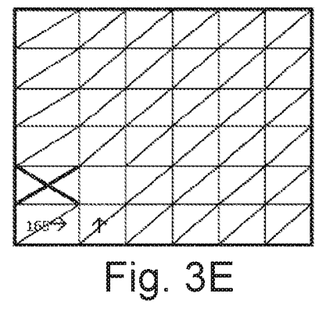
Figure 3F:
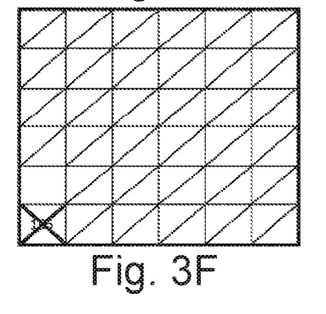

FIG. 3A depicts a situation having the highest possible storage density, i.e. the storage density is higher than an upper threshold (and self-evidently higher than the lower threshold). Thus, the aisle-based control scheme may not be applicable. Instead, a puzzle-based control scheme can be used. Here, n is 35 and m is 36, making d=97%. If n were 34, d would be 94%. Hence, in this case, the upper threshold can be approximately 95%.

FIG. 3 depicts an exemplary puzzle-based sequence A to F selected from in total 13 necessary steps/sequences to move the sample container carrier to the transfer location 165.

Figure 4A:
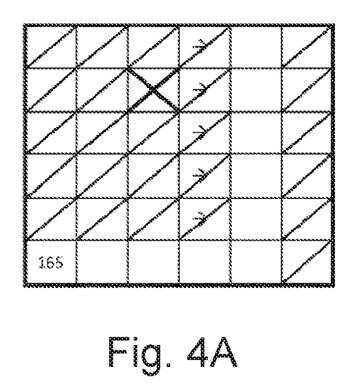
FIGS. 4A-C illustrate schematically a buffer area controlled using a transition control scheme according to an embodiment of the present disclosure.
Figure 4B:
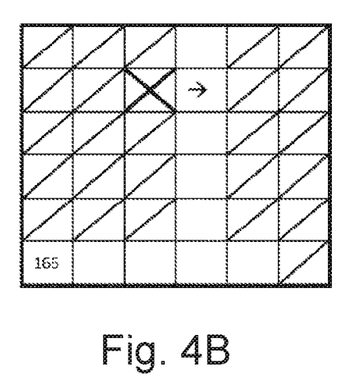
Figure 4C:
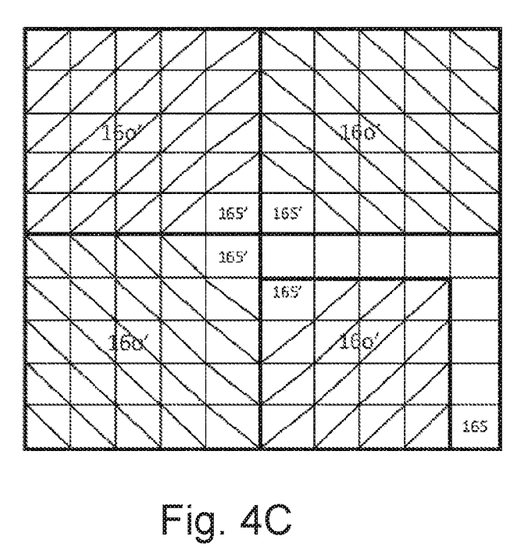

FIG. 4 shows a situation when the buffer area 160 is controlled using a transition control scheme. The transition control scheme may be applied if the control scheme is switched between the aisle-based control scheme and the puzzle-based control scheme. The transition control scheme may be used if the storage density is larger than the lower threshold but smaller than the upper threshold.

In FIGS. 4A and B at least one vertical aisle can be available and one horizontal aisle leading to the transfer location 165 can be free of sample container carriers. As depicted in FIGS. 4A and B, a column of sample container carriers can be moved simultaneously or sequentially to the right. As depicted in FIG. 4B, a vertical aisle can be formed, such that the sample container carrier can move one field to the right, move 4 fields down and move 3 fields to the left to reach the transfer location 165.

Here, n is 26 and m is 36, making d=72%. If the second column from the left were not filled in FIG. 4A, n would be 21 and d=62%, giving an estimation for the lower threshold. In this case, no column needs to be moved, such that a sample container carrier can reach the transfer location 165.

FIG. 4C depicts the buffer area 160 having an increased number of available buffer fields for the sake of explanation. As depicted, the storage density is such that no completely free aisle is available, as this is the case in FIGS. 4A and B. To deal with this situation, the buffer area 160 can be logically segmented in four equally sized sub buffer areas 160', each sub buffer area 160' having a respective sub transfer location 165', the respective sub transfer locations 165' each having a free connection to the transfer location 165. The sub buffer areas 160' can each operate according to the puzzle-based control scheme.

Figure 5A:
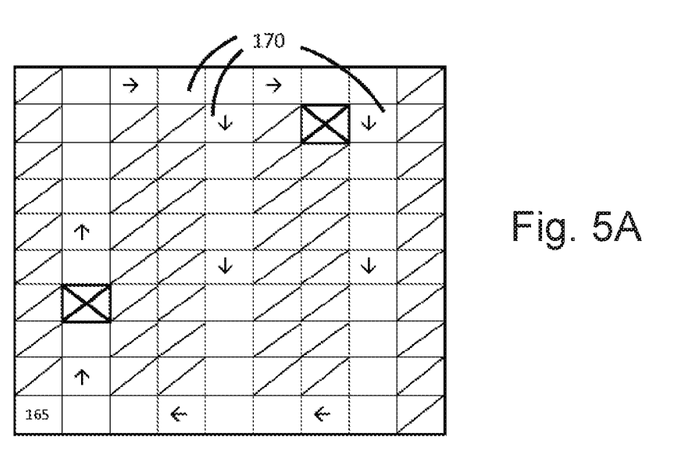
FIGS. 5A-B illustrate schematically a buffer area controlled using an aisle-based control scheme and having one-way aisles according to an embodiment of the present disclosure.
Figure 5B:
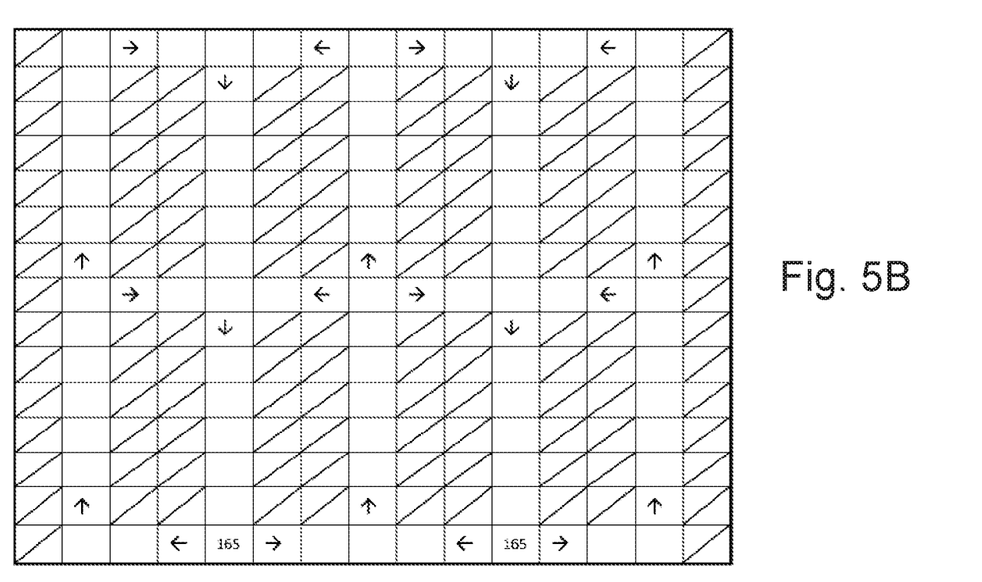

FIG. 5 shows a situation when the buffer area 160 is controlled using an aisle-based control scheme. Additionally, the buffer area 160 can have at least one one-way aisle 170. In the shown example, all aisles can be one-way aisles 170. The sample container carriers can move in a single direction in the at least one one-way aisle. In FIG. 5, the corresponding direction of movement or traffic for each one-way aisle is indicated by an arrow.

Now referring to FIG. 5A, no dead ends, or blind alleys, are present in the buffer area 160 in contrast to the buffer area 160 shown in FIG. 2A. The buffer area and its aisles, respectively, can be configured or arranged such that at least one, in particular each, "buffer" or "storage" field or position can be reachable from the transfer location 165 via a first route or path within or inside the buffer area 160. The first route can be different from a second route back to the transfer location. In the shown example, this can be enabled or facilitated by adding a fifth aisle formed at the top extending from left to right.

When the first sample container carrier at the top right in FIG. 5A (double-hatched field) leaves its buffer field in order to exit the buffer area 160, the second sample container carrier at the bottom left may already move towards the former buffer field of the first sample container carrier in order to be buffered or stored there. Due to the one-way aisles and the one-way traffic, respectively, the first and the second sample container carriers do not block each other.

FIG. 5B depicts the buffer area 160 having an increased number of available buffer fields. In addition to the aisle, in FIG. 5B, horizontally from left to right extending aisles at the top and at the bottom, there can be a horizontal aisle in the middle or center. Additionally, the buffer area can have two transfer locations 165. In other embodiments, the buffer area may have more than two transfer locations, for example 3, 4, 5, 6, 7, 8 or even more.

The embodiment of the method shown in FIG. 5 comprising controlling the buffer area using the aisle-based control scheme, wherein the buffer area has at least one one-way aisle, wherein the sample container carriers move in a single direction in the one-way aisle, may be independent of controlling the buffer area using the puzzle-based control scheme and/or the transition control scheme as a function of the storage density of the buffer area a protectable invention.

It is noted that terms like "preferably," "commonly," and "typically" are not utilized herein to limit the scope of the claimed embodiments or to imply that certain features are critical, essential, or even important to the structure or function of the claimed embodiments. Rather, these terms are merely intended to highlight alternative or additional features that may or may not be utilized in a particular embodiment of the present disclosure.

Having described the present disclosure in detail and by reference to specific embodiments thereof, it will be apparent that modifications and variations are possible without departing from the scope of the disclosure defined in the appended claims. More specifically, although some aspects of the present disclosure are identified herein as preferred or particularly advantageous, it is contemplated that the present disclosure is not necessarily limited to these preferred aspects of the disclosure.

We claim:

1. A method of operating a laboratory sample distribution system, wherein the laboratory sample distribution system comprises a number of sample container carriers, wherein the sample container carriers are adapted to carry one or more sample containers, wherein the sample containers comprise samples to be analyzed by a number of laboratory stations, and a transport plane, wherein the transport plane is adapted to support the sample container carriers, the method comprises:

allocating an area of the transport plane as a buffer area, wherein the buffer area is adapted to store a variable number of sample container carriers; and dynamically controlling the buffer area using a puzzle-based control scheme or using an aisle-based control scheme as a function of a storage density of the buffer area, wherein the buffer area is controlled using a transition control scheme, when the control scheme is switched between the aisle-based control scheme and the puzzle-based control scheme, wherein the transition control scheme is used when the storage density is larger than a lower threshold but smaller than an upper threshold.

2. The method according to claim 1, wherein the puzzle-based control scheme is used, if the storage density is equal to or larger than the upper threshold, and wherein the aisle-based control scheme is used, if the storage density is equal to or smaller than the lower threshold.

3. The method according to claim 1, wherein during the transition control scheme the buffer area is logically segmented into sub buffer areas, wherein each sub buffer area has a respective sub transfer location, wherein the sub buffer areas are controlled using a puzzle-based control scheme.

4. The method according to claim 1, wherein the sample container carriers comprise at least one magnetically active device.

5. The method according to claim 4, wherein the at least one magnetically active device is a permanent magnet.

6. The method according to claim 1, wherein the laboratory sample distribution system comprises a number of electro-magnetic actuators stationary arranged in rows and columns below the transport plane, wherein the electro-magnetic actuators are adapted to apply a magnetic force to the container carriers such that the sample container carriers move along the rows or along the columns.

7. The method according to claim 6, wherein the electro-magnetic actuators located inside the buffer area are activated based on the puzzle-based control scheme or based on the aisle-based control scheme as a function of the storage density of the buffer area.

8. The method according to claim 1, wherein the buffer area has a transfer locations, wherein the sample container carriers are transferred to/from the buffer area using the transfer locations.

9. The method according to claim 1, wherein during the aisle-based control scheme the buffer area has at least one one-way aisle, wherein the sample container carriers move in a single direction in the one-way aisle.

10. The method according to claim 1, wherein the buffer area has a rectangular shape.

11. The laboratory sample distribution system according to claim 1, wherein the laboratory sample distribution system further comprises, a control device adapted to perform the method of claim 1.

12. The laboratory sample distribution system according to claim 11, wherein the sample container carriers comprise at least one magnetically active device.

13. The laboratory sample distribution system according to claim 12, wherein the at least one magnetically active device is a permanent magnet.

14. The laboratory sample distribution system according to claim 11, further comprises, a number of electro-magnetic actuators stationary arranged in rows and columns below the transport plane, wherein the electro-magnetic actuators are adapted to apply a magnetic force to the container carriers such that the sample container carriers move along the rows or along the columns, and wherein the control device is adapted to control the electromagnetic actuators located inside the buffer area based on the puzzle-based control scheme or the aisle-based control scheme as a function of the storage density of the buffer area.

15. A laboratory automation system, the laboratory automation system comprising:

the number of laboratory stations; and the laboratory sample distribution system according to claim 11, wherein the laboratory sample distribution system is adapted to distribute the sample container carriers between the laboratory stations.

* * * * *

UNITED STATES PATENT AND TRADEMARK OFFICE
CERTIFICATE OF CORRECTION

PATENT NO. : 11,092,613 B2  
APPLICATION NO. : 15/809032  
DATED : August 17, 2021  
INVENTOR(S) : Mohammadreza Mahmudimanesh et al.

Page 1 of 1

It is certified that error appears in the above-identified patent and that said Letters Patent is hereby corrected as shown below:

In the Claims

Column 10, Line 9, replace -- locations -- with "location"

Column 10, Line 11, replace -- locations -- with "location"

Signed and Sealed this  
Fourteenth Day of September, 2021

Drew Hirshfeld  
*Performing the Functions and Duties of the*  
*Under Secretary of Commerce for Intellectual Property and*  
*Director of the United States Patent and Trademark Office*